(No Model.)
C. S. BRADLEY.
SYSTEM OF DISTRIBUTION FOR ALTERNATING CURRENTS.
No. 570,118. Patented Oct. 27, 1896.
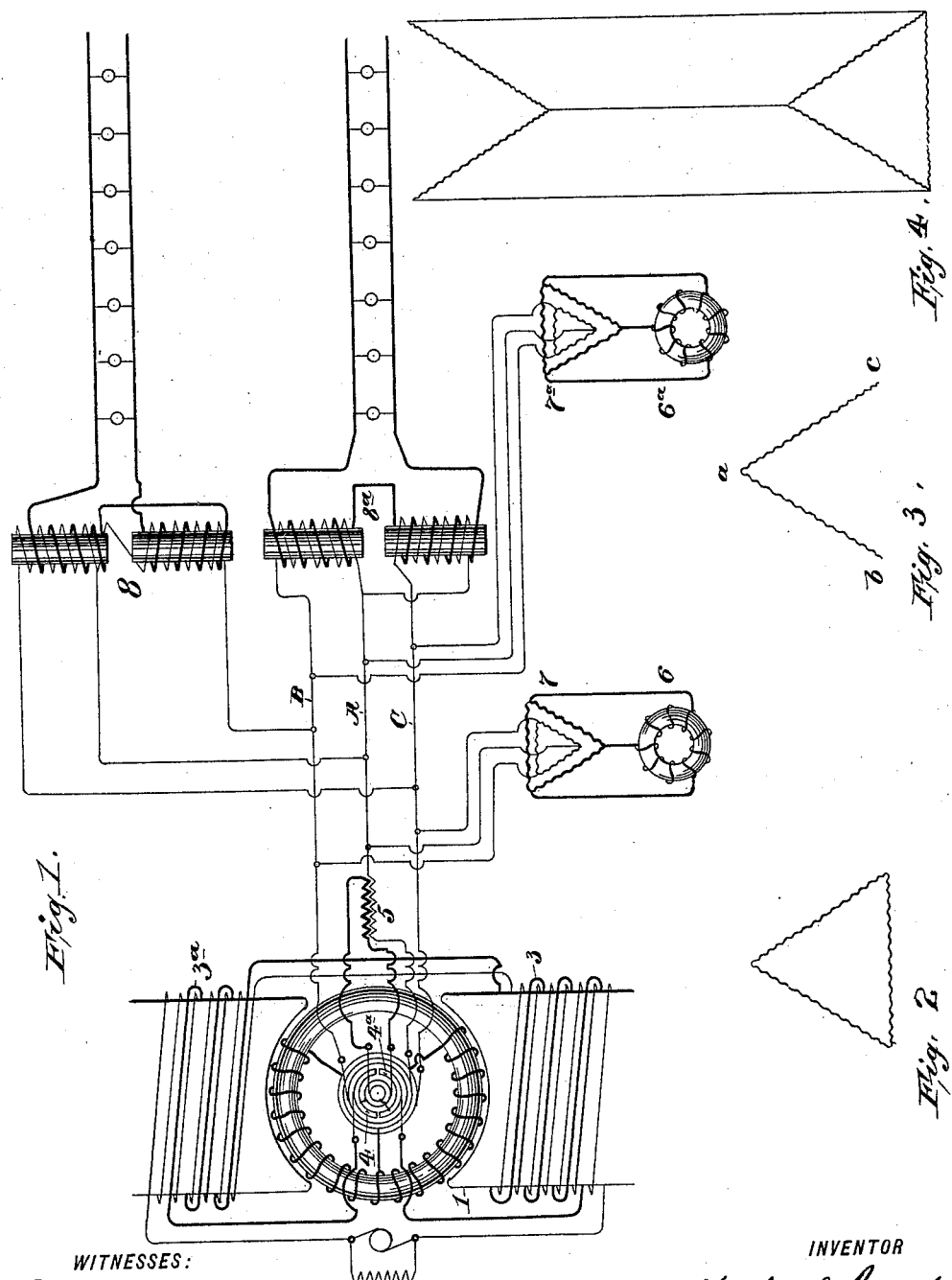
WITNESSES:
C. W. Benjamin
E. C. Grigg
INVENTOR
Charles S. Bradley
BY
Robt. H. Read
his ATTORNEY

UNITED STATES PATENT OFFICE.

CHARLES S. BRADLEY, OF AVON, NEW YORK, ASSIGNOR TO THE GENERAL ELECTRIC COMPANY, OF NEW YORK.

SYSTEM OF DISTRIBUTION FOR ALTERNATING CURRENTS.

SPECIFICATION forming part of Letters Patent No. 570,118, dated October 27, 1896.

Application filed April 3, 1895. Renewed March 21, 1896. Serial No. 584,352. (No model.)

*To all whom it may concern:*

Be it known that I, CHARLES S. BRADLEY, a citizen of the United States, residing in Avon, in the county of Livingston and State of New York, have invented certain new and useful Improvements in Systems of Distribution for Alternating Currents, of which the following is a specification.

This invention relates to systems of alternating-current distribution. It is known by those skilled in the art that polyphase systems are liable to be unbalanced by loads being placed upon one or more of the circuits, while one or more of the circuits may be unloaded.

It is the object of my invention to do away with the necessity of maintaining any balance, it being known that polyphase motors do not require an absolute balance and that a few volts more or less have very little effect upon the running of the motors, while lamps are very sensitive as to any change in electromotive force. I therefore feed my lamps from a single circuit and transform the energy supplied by the polyphase mains to a single phase for the lamp distribution. By taking three phases from a triphase alternating system and using two of them, abandoning one, I have the two which I use at one-hundred-and-twenty-degrees phase apart.

By reference to the views in the drawings, Figure 1 represents diagrammatically the system of distribution. Fig. 2 represents the delta winding; Fig. 3, two of the circuits of the delta winding; and Fig. 4, a part of the system, in which the upper part represents the generator-winding and the lower part the motor-winding, Figs. 2, 3, and 4 being to illustrate the operation of the phases.

At the supply-station is located a generator 1, which may be of any approved construction, for imposing on line a triphase alternating current. The field-magnet is excited by a direct-current machine, (indicated at 2,) and may also have a compounding coil 3 3$^a$, supplied by a transformer connected with one of the wires of the system. I have shown diagrammatically a ring armature for convenience of illustration. In the ordinary construction a plan similar to that shown in Fig. 2 is followed, in which three coils or sets of coils symmetrically spaced about the core connect with the three supply-wires. The form shown in Fig. 2 is a simple illustration of a delta type of winding in which the line-wires connect with the three corners of the delta. I find that one of the coils of the delta may be omitted from the armature, the other two coils, whether arranged singly or in groups, being spaced so as to develop phases one hundred and twenty degrees apart. This organization is diagrammatically illustrated in Fig. 3, where the third side of the delta is omitted. If we consider the electromotive forces of such an organization, arranged, for example, as shown on the armature in Fig. 1, it is found that the phases at the points $a\ b\ c$ are one hundred and twenty degrees apart, and that if the point $a$ be connected with the middle wire of a triphase system and the points $b$ and $c$ with the other two wires currents of uniform electromotive force will be supplied to the three wires. As shown in the diagram, a single coil is placed on two-thirds of the ring core, its middle point being connected with the middle wire and its two terminal points being connected with the other two line-wires.

For simplicity of illustration the armature of the generator has been shown as the rotary element, and the coils connect with ring contacts leading through appropriate brushes to the three line-wires. The rotary element of the generator is also provided with a split commutator 4 4$^a$, upon which bear two brushes leading to the terminals of the auxiliary field-magnet circuit 3 3$^a$. Connected with the sections of this commutator are two contact-rings, as indicated, upon which bear brushes connected, respectively, with the terminals of the secondary circuit of a transformer 5, the primary wire of which is interposed in the middle wire of the system, or the wire which would receive electromotive force from the point $a$ in the open delta shown in Fig. 3. The line-wires are represented at A B C. From this may lead local supply-wires to motors, as at 6 6$^a$, which may discharge directly into the motor-circuits or may be passed into transformers which supply current of a lower potential to the motors. The motor-transformers are indicated at 7 7$^a$ and may be single triphase transformers or independent transformers, as will be well understood by those familiar with the art. From what has been hereinbefore said it will be understood that the transformers connected with the three line-wires in the manner indicated receive therefrom three currents differing in phase by one hundred and twenty degrees. Where it is desired to operate a group of lamps, the three supply-wires A B C may be led to a transforming apparatus, (represented at 8 $8^a$.) Since the lamps of any group or local plant are supplied by two leads, it is necessary, in order to produce a minimum fluctuation in the luminosity of the several lamps, that a local device, such as 8 or $8^a$, be employed. Moreover, it is desirable, since more than one phase is furnished the transforming device, that these phases shall be so placed in the transforming apparatus that the phases of secondary electromotive force shall be so related in the lamp-circuit as to oppose one another to a minimum degree and thereby produce the most efficient resultant electromotive force. These ends may be effected by connecting the three wires A B C with two coils, as shown at 8 or $8^a$. These coils are preferably placed upon independent transformers. The middle wire A is connected with a point between the coils. The phases of electromotive force in the two coils are therefore one hundred and twenty degrees apart, and we thus have an organization corresponding in arrangement to the open delta winding shown in Fig. 3, where the sides of the delta represent the two primary circuits of the transformer and the points $a$, $b$, and $c$ the points of connection with the triphase supply-circuit. Therefore the magnetomotive forces of the two cores are one hundred and twenty degrees apart, which would tend to produce in the secondary of the two cores electromotive forces one hundred and twenty degrees apart; but it will be noticed that the coil of the secondary of the lower core at 8 is reversed with respect to the upper, and it is known that by reversing a one-hundred-and-twenty-degree phase it will become a phase of sixty degrees. Therefore the electromotive forces in the two secondaries are sixty degrees apart and a resultant current will be produced by the two electromotive forces of sixty degrees difference in phase. Thus two electromotive forces on the lamp-circuit are brought closer together in phase and oppose one another to a less degree and are therefore more efficient in the production of current than if they had not been so shifted and had been separated by one hundred and twenty degrees. At $8^a$ a similar result is brought about by reversing the connections of the supply-wires with relation to the primary coils instead of the secondaries, as shown at 8.

It will thus be seen that if 8 and $8^a$ represent independent groups of lamps in the same system the operation of either or both has precisely the same effect upon the load imposed on the several supply-wires, and the addition or subtraction of lamps from any lighting-circuit only affects the mains according to the $C^2R$ loss. I have found that the middle wire in the case of the lamp-load carries approximately twice as much current as either of the outside wires, while for the motors the current is equal in each of the three wires. Therefore in order to compound the machine I use the middle wire, because all the energy of the lamps is represented by current flowing in that wire, and the current fed to the motors is also proportional in this line, while I find that the current in the two outside wires B and C varies slightly as the loads vary, and consequently as the phases vary among themselves. Therefore I place the transformer 5, which supplies the compound coil of the field-magnet of the generator, in the middle wire A, or if no transformer be used said wire may be connected directly with commutator $44^a$. Thus the machine becomes self-regulating for the changes of load under all conditions of service.

Having thus described my invention, what I claim as new, and desire to secure by Letters Patent, is—

1. A system of electrical distribution comprising a generator delivering a plurality of phasially-differing alternating currents, and a single-phase lamp-circuit supplied thereby through a transforming device provided with two magnetic circuits energized by two coils through which different current-phases are led and discharging in common into the lamp-circuit, the phases being reversely applied to the transformer-coils to bring the two electromotive forces operating on the lamp-circuit closer in phase.

2. An alternating-current system comprising a generator provided with two coils or windings spaced one hundred and twenty degrees apart and connected in series relation and provided with three terminals connecting respectively with the junction and ends of the coils, whereby three electromotive forces equidistant in phase are delivered at the terminals, and three line-wires connecting with said terminals.

3. A system of distribution for alternating currents comprising a triphase generator, line-wires connected therewith, triphase alternating motors supplied thereby, a single-phase lighting-circuit, and a transforming device having a plurality of primary and secondary coils, the latter discharging in common into the lighting-circuit and the former to the several triphase supply-wires, the several coils being relatively reversed so as to bring the several electromotive forces in the secondaries closer in phase than the electromotive forces of the line-wires.

4. A system of distribution for alternating currents comprising a triphase generator having two generating-coils or groups of coils one hundred and twenty degrees apart and connected with three line-wires, triphase motors supplied from said line-wires, and a single-phase lighting-circuit inductively related through a transformer to both current-phases.

5. A system of distribution for alternating currents comprising a triphase generator having two generating-coils or groups of coils one hundred and twenty degrees apart and connected with three line-wires, triphase motors supplied from said line-wires, a single-phase lighting-circuit supplied by a transformer having its primary supplied with two currents one hundred and twenty degrees displaced in phase, and a compound coil on the generator supplied by the middle wire of the system.

In testimony whereof I have hereunto subscribed my name this 1st day of April, A. D. 1895.

CHARLES S. BRADLEY.

Witnesses:
 ROBT. H. READ,
 GEORGE A. ADAMS.